United States Patent
Suzuki et al.

(10) Patent No.: US 9,235,794 B2
(45) Date of Patent: Jan. 12, 2016

(54) INFORMATION PROCESSING DEVICE, NON-TRANSITORY COMPUTER READABLE MEDIUM, AND INFORMATION PROCESSING METHOD

(71) Applicant: FUJI XEROX CO., LTD., Minato-ku, Tokyo (JP)

(72) Inventors: Fumihisa Suzuki, Kanagawa (JP); Kohshiro Inomata, Kanagawa (JP); Hirochika Shionoiri, Kanagawa (JP); Yosuke Kinoshita, Kanagawa (JP); Yasushi Amano, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/280,839

(22) Filed: May 19, 2014

(65) Prior Publication Data

US 2015/0116752 A1 Apr. 30, 2015

(30) Foreign Application Priority Data

Oct. 25, 2013 (JP) .................................. 2013-222241

(51) Int. Cl.
*G06F 21/10* (2013.01)
*G06K 15/00* (2006.01)

(52) U.S. Cl.
CPC .................................. *G06K 15/4095* (2013.01)

(58) Field of Classification Search
CPC .................................................. G06K 15/4095
See application file for complete search history.

(56) References Cited

U.S. PATENT DOCUMENTS

2009/0021764 A1* 1/2009 Kano ............................. 358/1.14
2010/0225947 A1* 9/2010 Yoshida et al. ............... 358/1.13
2010/0263044 A1* 10/2010 Yamada .......................... 726/17

FOREIGN PATENT DOCUMENTS

JP 2008-158965 A 7/2008
JP 2010-224947 A 10/2010

OTHER PUBLICATIONS

Machine translation in english of JP Pub 2008-158965 to Sato et al.*
Machine Translation of JP Pub 2008-158965 to Sato et al.*

* cited by examiner

*Primary Examiner* — Benny Q Tieu
*Assistant Examiner* — Haris Sabah
(74) *Attorney, Agent, or Firm* — Sughrue Mion, PLLC

(57) ABSTRACT

An information processing device includes a security level determining unit that determines a security level, the security level indicating a level of security related to leakage of information in an image processing device, and an instructing unit that changes an output method to an output method having a high security level and gives at least one of two instructions, in a case where the security level does not satisfy a predetermined condition, the two instructions including an instruction for outputting information notifying the output method that has been changed, and an instruction for outputting information prompting for change of the security level in the image processing device.

13 Claims, 11 Drawing Sheets

| SPECIFICATION AS CONFIDENTIAL INFORMATION | CONFIDENTIALITY LEVEL |
|---|---|
| SPECIFIED AS CONFIDENTIAL INFORMATION | 1 |
| NOT SPECIFIED AS CONFIDENTIAL INFORMATION | 0 |

| IMAGE OUTPUT DEVICE SETTING | SECURITY LEVEL |
|---|---|
| SECURITY PRINT ON | 1 |
| SECURITY PRINT OFF | 0 |

INFORMATION PROCESSING DEVICE, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2013-222241 filed Oct. 25, 2013.

BACKGROUND

The present invention relates to an information processing device, a non-transitory computer readable medium, and an information processing method.

SUMMARY

According to an aspect of the invention, there is provided an information processing device including a security level determining unit that determines a security level, the security level indicating a level of security related to leakage of information in an image processing device, and an instructing unit that changes an output method to an output method having a high security level and gives at least one of two instructions, in a case where the security level does not satisfy a predetermined condition, the two instructions including an instruction for outputting information notifying the output method that has been changed, and an instruction for outputting information prompting for change of the security level in the image processing device.

BRIEF DESCRIPTION OF THE DRAWINGS

Exemplary embodiments of the present invention will be described in detail based on the following figures, wherein.

DETAILED DESCRIPTION

<First Exemplary Embodiment>
<Configuration>

Figure 1:
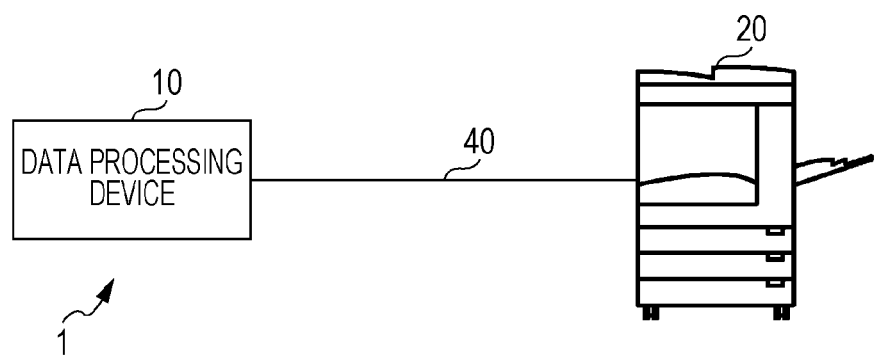
FIG. 1 is a schematic diagram illustrating an example of the overall configuration of a system.

FIG. 1 is a schematic diagram illustrating an example of the overall configuration of a system 1 according to a first exemplary embodiment of the invention. The system 1 includes a data processing device 10 (an example of information processing device), and an image forming device 20 (an example of image processing device). The data processing device 10 is a data processing device such as a personal computer. The image forming device 20 is, for example, an electrophotographic image forming device. The image forming device 20 includes functions such as an image forming function for forming an image on a recording medium such as a sheet of paper, a copy function for copying an image, and a scan function for reading an image formed on a recording medium. Functions included in the image forming device 20 are not limited to these functions. For example, the image forming device 20 may include a facsimile function. Further, the image forming device 20 may not necessarily include all of the functions mentioned above. For example, the image forming device 20 may be configured so that the image forming device 20 includes the image forming function and the copy function but does not include other functions. A network 40 is a network such as a local area network (LAN) or a wide area network (WAN). The network 40 is a communication line that connects the data processing device 10 and the image forming device 20. A user operates the data processing device 10 to instruct input and output of document data. Document data inputted to the data processing device 10 is outputted by the image forming device 20.

Figure 2:
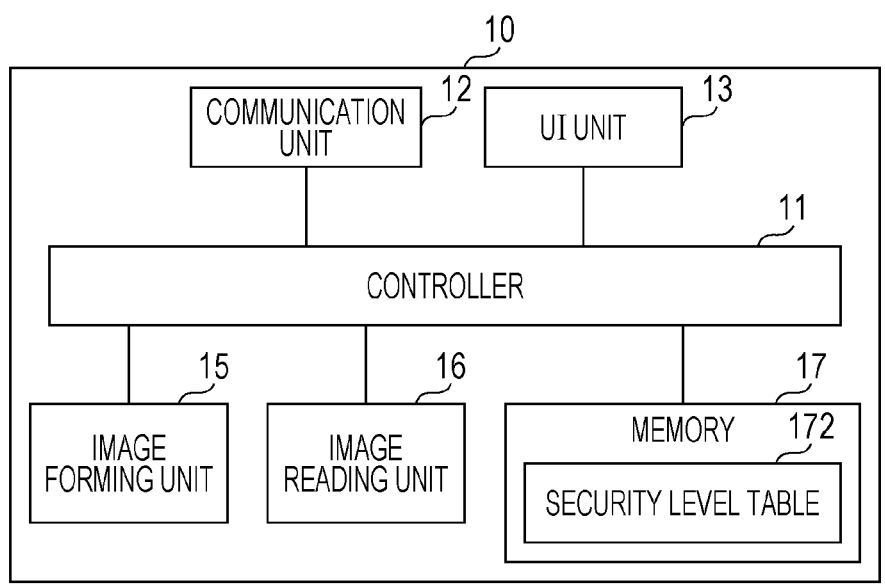
FIG. 2 is a block diagram illustrating an example of the hardware configuration of a data processing device.

FIG. 2 is a block diagram illustrating an example of the hardware configuration of the data processing device 10. In FIG. 2, a controller 11 includes an arithmetic unit such as a central processing unit (CPU), and internal memories such as a read only memory (ROM) and a random access memory (RAM). Programs to be executed by the arithmetic unit are stored in the ROM. The arithmetic unit controls operation of various units of the data processing device 10 by executing programs stored in the ROM and a memory 17 by using the RAM as a work area. A communication unit 12 communicates with the image forming device 20 via the network 40. A UI unit 13 includes operators such as various buttons and a touch sensor. The UI unit 13 supplies an operation signal corresponding to a user's operation to the controller 11. The controller 11 executes processing according to this operation signal. In addition, the UI unit 13 includes a liquid crystal panel and a liquid crystal drive circuit, and displays images under control by the controller 11. An image forming unit 15 and an image reading unit 16 are necessary when using the data processing device 10 as an image processing device. The image forming unit 15 forms an image on a recording medium such as a sheet of paper by the electrophotography system. The image reading unit 16 optically reads an image of a document. The memory 17 is, for example, a storage device such as a hard disk, and stores data and programs that are used by the controller 11.

Figure 3:
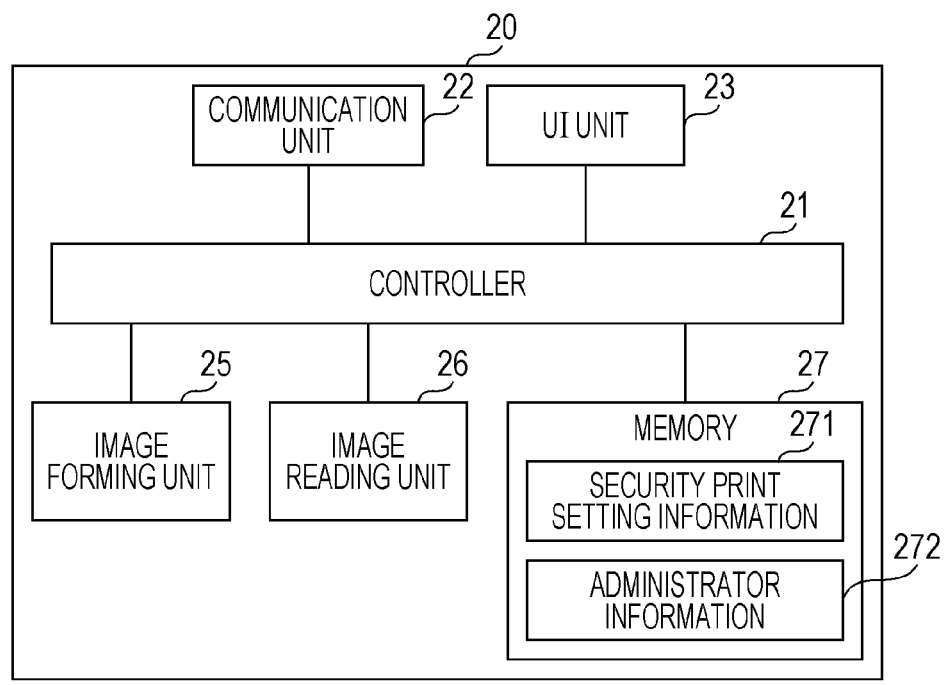
FIG. 3 is a block diagram illustrating an example of the hardware configuration of an image forming device.

Next, a hardware configuration of the image forming device 20 will be described with reference to FIG. 3. FIG. 3 is a block diagram illustrating an example of the hardware configuration of the image forming device 20. In FIG. 3, a controller 21 includes an arithmetic unit such as a CPU, and internal memories such as a ROM and a RAM. Programs to be executed by the arithmetic unit are stored in the ROM. The arithmetic unit controls various units of the image forming device 20 by executing programs stored in the ROM and a memory 27 by using the RAM as a work area. A communication unit 22 communicates with the image forming device 20 via the network 40. A UI unit 23 includes operators such as various buttons and a touch sensor. The UI unit 23 supplies an operation signal corresponding to a user's operation to the controller 21. The controller 21 executes processing according to this operation signal. In addition, the UI unit 23 includes a liquid crystal panel and a liquid crystal drive circuit, and displays images under control by the controller 21. An image forming unit 25 forms an image on a recording medium such as a sheet of paper by the electrophotography system. An image reading unit 26 optically reads an image of a document. The memory 27 is, for example, a storage device such as a hard disk, and stores data and programs that are used by the controller 21.

The memory 27 stores security print setting information 271, and administrator information 272. The security print setting information 271 is setting information indicating whether or not user authentication is required when outputting document data. In a case where the security print setting is "ON", the controller 21 operates as follows. That is, when the controller 21 receives, from another device, an instruction to output document data, the controller 21 does not output the received document data but temporarily accumulates the data in a predetermined storage area of the memory 27. In this case, the controller 21 waits until a user operates the UI unit 23 and user information is performed, and only after user authentication is performed, the controller 21 then outputs the document data being accumulated. Further, in a case where the security print setting is "OFF", the controller 21 operates as follows. That is, when the controller 21 receives, from another device, an instruction to output document data, the controller 21 outputs the document data as it is, without waiting for user authentication. The administrator of the image forming device 20 may change the security print setting information 271. Further, in a case where the security print setting is "ON", the document data to be accumulated is given a user identifier (user ID) for identifying a user. In this case, when a user outputs document data, user identification is performed on the basis of the user ID, and a user who has successfully authenticated himself/herself is allowed to output the document data. The administrator information 272 is information related to an administrator, such as the email address of the administrator.

Figure 4:
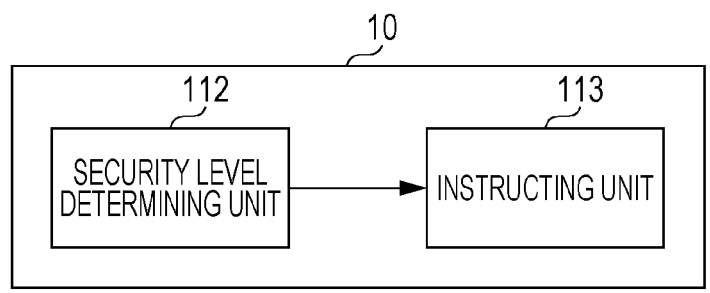
FIG. 4 is a block diagram illustrating an example of the functional configuration of a data processing device.

Next, a functional configuration of the data processing device 10 will be described with reference to FIG. 4. FIG. 4 is a block diagram illustrating a functional configuration of the data processing device 10. In the data processing device 10, a security level determining unit 112 and an instructing unit 113 are realized by the controller 11 or by the controller 11 and the communication unit 12. The security level determining unit 112 determines a security level indicating the level of security related to leakage of information when the data to be outputted (hereinafter also referred to as "target data") is outputted by an image output device (the image forming device 20). In the first exemplary embodiment, the security level determining unit 112 acquires the setting value of security print for the image forming device 20. In a case were the setting value of securing print is ON, the security level determining unit 112 determines that the level of security satisfies a predetermined condition, and in a case where the setting value of securing print is OFF, the security level determining unit 112 determines that the level of security does not satisfy a predetermined condition.

In a case where the security level does not satisfy a predetermined condition, the instructing unit 113 causes the image output device or a device different from the image output device to output at least one of the following pieces of information: information that notifies the user of the method of outputting target data; and information that prompts the user to change the level of security related to leakage of information in the image output device.

<Operation>

Next, operation of the first exemplary embodiment will be described. The following operation example will be directed to a case where the data processing device 10 transmits document data to the image forming device 20, and the image forming device 20 outputs the document data.

Figure 5:
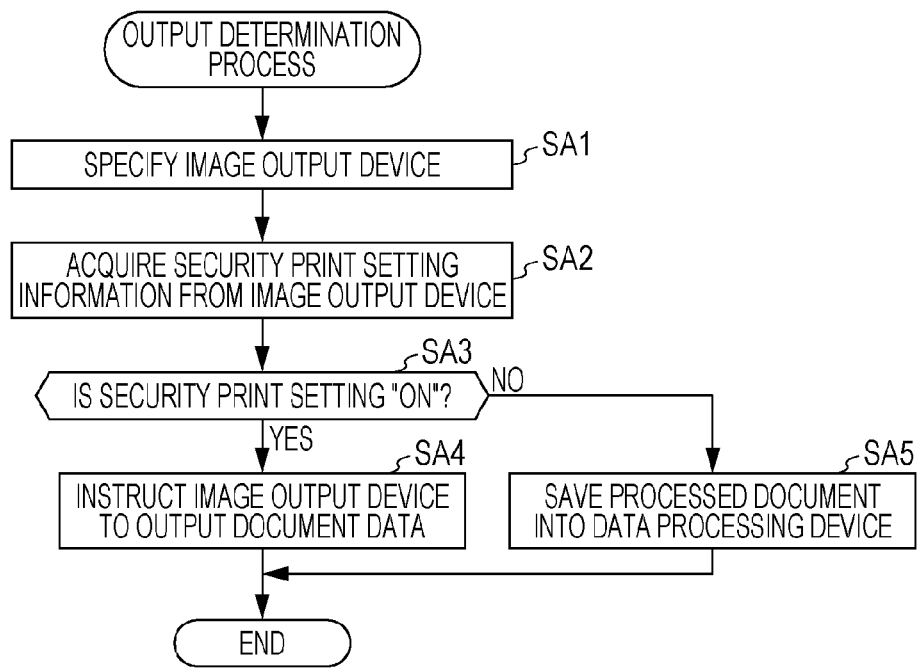
FIG. 5 is a flowchart illustrating a flow of an output determination process executed by a data processing device.

FIG. 5 is a flowchart illustrating a flow of an output determination process executed by the data processing device 10. First, by using the UI unit 13 of the data processing device 10, the user instructs output of document data and specifies the device to which to output the document data. The UI unit 13 outputs information corresponding to an operation made by the user. On the basis of the information outputted from the UI unit 13, the controller 11 accepts information indicating the output instruction for document data and the image output device (step SA1).

Once the image output device is specified, the controller 11 inquires the device specified as the image output device in step SA1, that is, the image forming device 20, for the setting value of security print, and acquires setting information about security print from the image forming device 20 (step SA2). In the first exemplary embodiment, the image forming device 20 manages the setting value of security print by a management information database called MIB, and the data processing device 10 acquires the setting value by using SNMP.

Next, the controller 11 determines whether or not the acquired value of security print is ON. In a case where the setting value is ON (step SA3; YES), the controller 11 instructs the image output device, that is, the image forming device 20, to output the document data (step SA4). In step SA4, the controller 11 assigns a user ID to the document data and the output instruction for the document data, and transmits the document data and the output instruction to the image forming device 20. In a case where the setting value of security print is OFF (step SA3; NO), the controller 11 temporarily stores the document data into a predetermined storage area in the memory 17 of the data processing device 10 (step SA5).

Upon receiving the document data and the output instruction transmitted in step SA3 illustrated in FIG. 5 from the data processing device 10, the controller 21 of the image forming device 20 makes reference to the setting information of "security print" stored in the memory 27 of the image forming device 20. In a case where the value of "security print" is "OFF", the controller 21 outputs the received document data as it is. In a case where the value of "security print" is "ON", the controller 21 temporarily accumulates the received document data into a predetermined storage area in the memory 27, and waits until user authentication is performed by the user.

In a case where the value of "security print" for the image forming device 20 is "ON", the user instructs output of document data by using the UI unit 23 of the image forming device 20. On the basis of operational information outputted from the UI unit 23, the controller 21 displays, on the UI unit 23, a screen that prompts the user to enter user information for performing user authentication. The user enters user information by using the UI unit 23. The controller 21 performs user authentication by using the entered user information, and in a case where authentication succeeds, the controller 21 causes the image forming unit 25 to output the document data accumulated in the memory 27.

Figure 6:
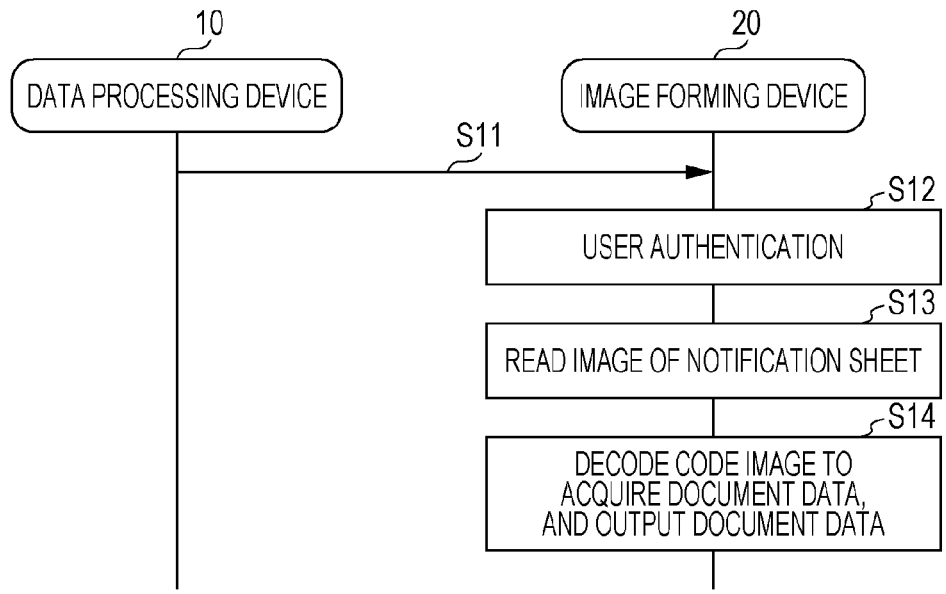
FIG. 6 is a sequence diagram illustrating a flow of processing executed by a data processing device and an image forming device.

Next, a flow of processing executed in the data processing device 10 and the image forming device 20 in a case where the security print setting is OFF will be described with reference to the sequence diagram illustrated in FIG. 6.

First, the controller 11 generates image data including a code image (such as a QR Code®), and transmits the generated image data and an output instruction for the image data to the image forming device 20 that is an image output device (step S11). The code information is information obtained by coding information (such as an IP address or a uniform resource locator (URL)) necessary for accessing document data stored in the data processing device 10. The information indicated by this code image may include information indicating a procedure for acquiring document data. Upon receiving the image data and the output instruction for the image data from the data processing device 10, the controller 21 of the image forming device 20 forms an image representing the image data on a medium such as a sheet of paper by controlling the image forming unit 25 in accordance with the received output instruction. At this time, the data processing device 10 may output the image data by transmitting the image data to a device such as a tablet terminal or a smartphone, for example.

Figure 7:
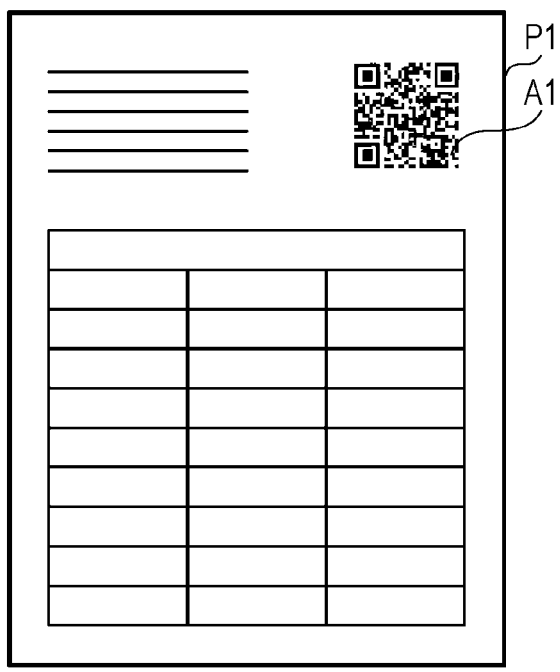
FIG. 7 illustrates an example of a medium on which a code image is formed.

FIG. 7 illustrates an example of a medium on which a code image is formed. As illustrated in FIG. 7, a code image A1 is formed on a medium P1. Further, for example, characters indicating messages such as "The document is not outputted because the security print setting is OFF" or "To output the document, please scan this sheet" may be formed on the medium P1 by the image forming device 20. In the following description, for the convenience of explanation, a medium on which a code image is formed as illustrated in FIG. 7 will be referred to as "notification sheet".

As the "notification sheet" mentioned above, only one sheet may be outputted. Alternatively, such a "notification sheet" may be outputted from the image forming device 20 at predetermined time intervals. In a case where a notification sheet is outputted at predetermined time intervals, for example, the image forming device 20 may repeatedly transmit image data representing a notification sheet to the image forming device 20 at predetermined time intervals until the data processing device 10 receives an acquisition request for document data from the image forming device 20. Further, a notification sheet may be outputted at predetermined time intervals by controlling the image forming unit 25, until an output instruction is made by the user by using the UI unit 23 after receiving an output instruction for the notification sheet from the data processing device 10.

The user checks the "notification sheet" outputted from the image forming device 20. For example, in a case where an operation procedure is described in the "notification sheet", the user operates the image forming device 20 in accordance with the operation procedure. Alternatively, the user operates the image forming device 20 in accordance with an operation procedure of which the user is notified in advance from the administrator or the like. When the user performs an operation for acquiring document data, that is, scanning of a notification sheet, by using the UI unit 23, the controller 21 displays, on the UI unit 23, a screen that prompts the user to enter user information for performing user authentication. The user enters user information by using the UI unit 23. The controller 21 performs user authentication by using the entered user information (step S12), and when the user authentication succeeds, the controller 21 controls the image reading unit 26 to read the "notification sheet" (step S13). The controller 21 determines the storage location of document data by decoding a code image read by the image reading unit 26, and acquires document data by accessing the determined storage location. Then, the controller 21 controls the image forming unit 25 to output the acquired document data by forming the image of the document data on a medium such as a sheet of paper (step S14).

<Second Exemplary Embodiment>
<Configuration>

Figure 8:
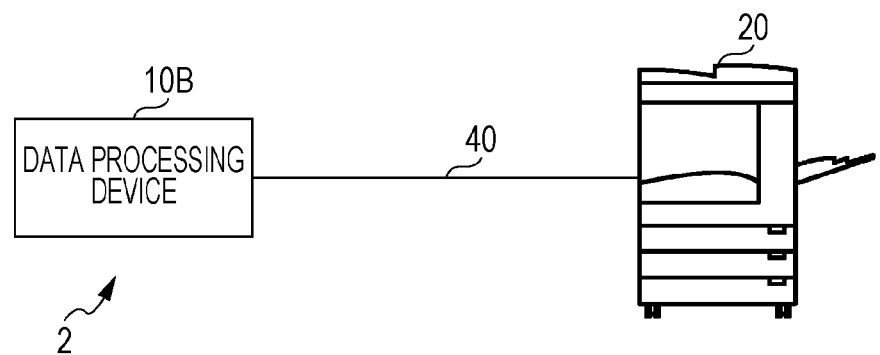
FIG. 8 is a schematic diagram illustrating an example of the overall configuration of a system.

Next, a second exemplary embodiment of the invention will be described. FIG. 8 is a schematic diagram illustrating the overall configuration of a system 2 according to the second exemplary embodiment of the invention. The system 2 includes a data processing device 10B, and the image forming device 20. The image forming device 20 is the same as that described above in the first exemplary embodiment with reference to FIG. 1.

Figures 9, 10:
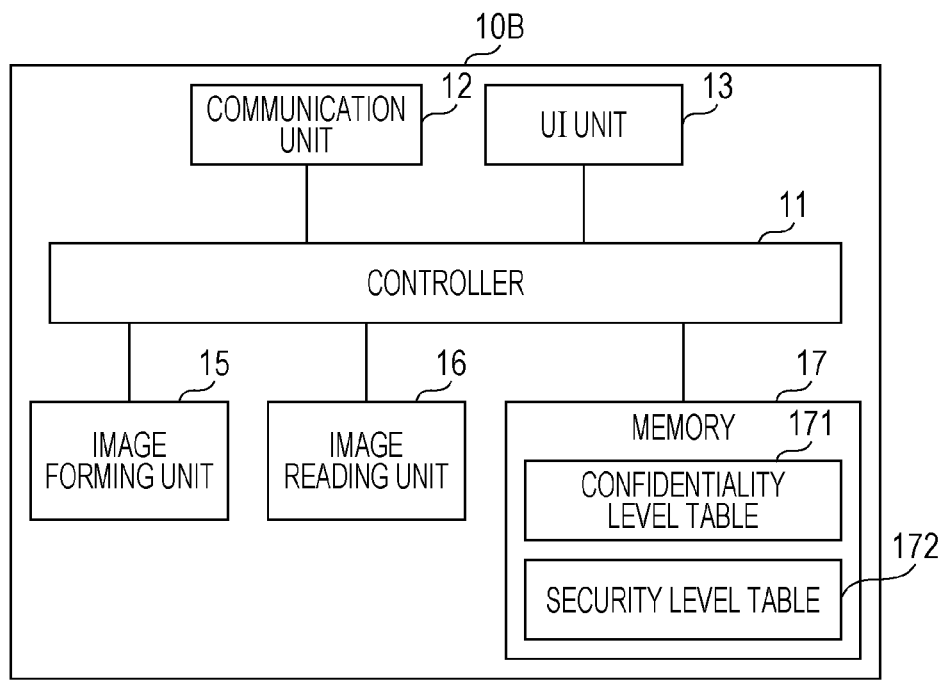
FIG. 9 is a block diagram illustrating an example of the hardware configuration of a data processing device.
FIG. 10 illustrates an example of the contents of a confidentiality level table.

FIG. 9 is a block diagram illustrating a hardware configuration of the data processing device 10B. The configuration of the data processing device 10B differs from the configuration of the data processing device 10 according to the first exemplary embodiment mentioned above in that a confidentiality level table 171 and a security level table 172 are stored in the memory 17. Accordingly, components that are the same as those of the data processing device 10 are denoted by the same symbols and a description of those components is omitted.

The confidentiality level table 171 is a table that is referenced when determining a confidentiality level indicating the level of confidentiality of the document data to be processed. In the second exemplary embodiment, the confidentiality level is set for each individual piece of document data. The security level table 172 is a table that is referenced when determining a security level indicating the level of security when document data is outputted by the image forming device 20. In the second exemplary embodiment, the security level indicates the degree to which measures are taken to prevent leakage of confidential information in a device that outputs document data. Accordingly, the security level set for each individual device that outputs document data.

FIG. 10 illustrates an example of the contents of the confidentiality level table 171. As illustrated in FIG. 10, in this stable, "specification as confidential information" and "confidentiality level" are stored as items in association with each other. As illustrated in FIG. 10, "1" is associated as "confidentiality level" with "specified as confidential information", and "0" is associated as "confidentiality level" with "not specified as confidential information". That is, in the second exemplary embodiment, "1" is set as "confidentiality level" for document data that has been determined as being specified as confidential information, and "0" is set as "confidentiality level" for document data that has been determined as not being specified as confidential information.

Figures 11, 12:
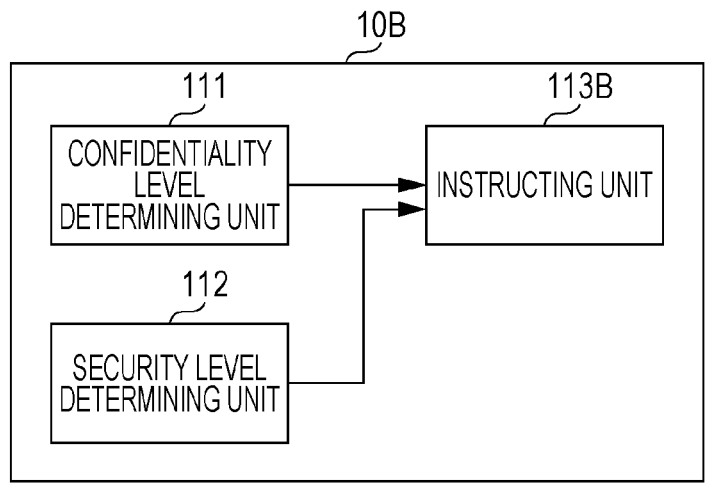
FIG. 11 illustrates an example of the contents of a security level table.
FIG. 12 is a block diagram illustrating an example of the functional configuration of a data processing device.

FIG. 11 illustrates an example of the contents of the security level table 172. As illustrated in FIG. 11, in this stable, "image output device setting" and "security level" are stored as items in association with each other. Of these items, the item "image output device setting" stores information indicating whether or not the setting when the image output device (that is, the image forming device 20) outputs document data is a setting with which user authentication is required for output of document data. In the second exemplary embodiment, setting information about "security print" is used as the setting information for the image forming device 20. The "security print" represents information indicating whether or not user authentication is required when outputting document data. In a case where this "security print" is "ON", document data sent to the image forming device 20 is not outputted from the image forming device 20 until the user enters user information (for example, a user ID and a password) by using the UI unit 23 and successfully authenticates himself/herself. That is, document data is outputted only after user information is entered into the image forming device 20 and user authentication succeeds. In a case where this "security print" is "OFF", document data sent to the image forming device 20 is outputted from the image forming device 20 without requiring user authentication.

Next, a functional configuration of the data processing device 10B will be described with reference to FIG. 12. FIG. 12 is a block diagram illustrating a functional configuration of the data processing device 10B. In the data processing device 10B, a confidentiality level determining unit 111, the security level determining unit 112, and an instructing unit 113B are realized by the controller 11 or by the controller 11 and the communication unit 12. The confidentiality level determining unit 111 determines a confidentiality level indicating the level of confidentiality of target data. The security level determining unit 112 is the same as that according to the first exemplary embodiment mentioned above. That is, the security level determining unit 112 determines a security level indicating the level of security related to leakage of information when the target data is outputted by an image output device (the image forming device 20). The instructing unit 113B causes the image output device to receive the target data in a case where the relationship between the confidentiality level and the security level satisfies a predetermined condition (second condition). In a case where the relationship between the confidentiality level and the security level does not satisfy the predetermined condition, the instructing unit 113B causes the image output device or a device different from the image output device to output at least one of the following pieces of information: information that notifies the user of the method of outputting target data; and information that prompts for change of the level of security related to leakage of information in the image output device.

<Operation>

Figure 13:
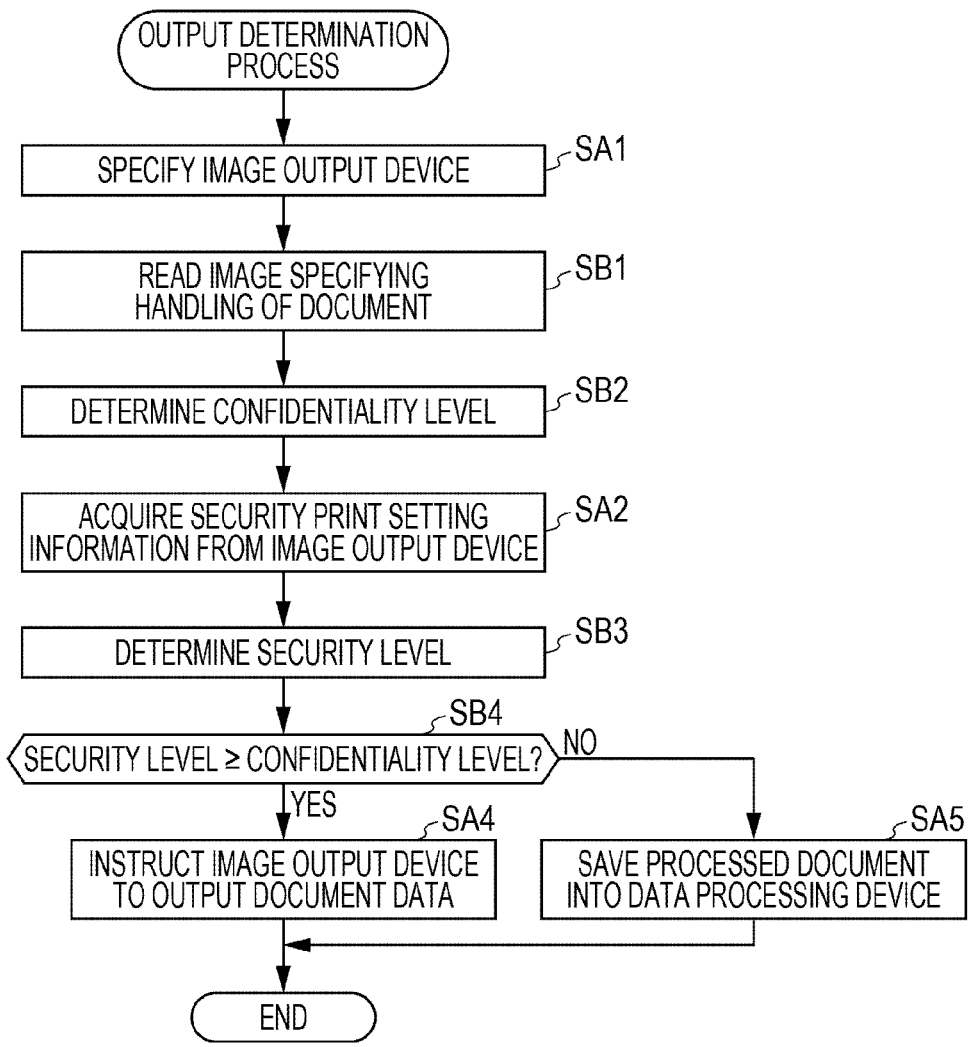
FIG. 13 is a flowchart illustrating a flow of an output determination process executed by a data processing device.

Next, operation according to the second exemplary embodiment will be described with reference to the flowchart illustrated in FIG. 13. The flowchart illustrated in FIG. 13 differs from the flowchart illustrated in FIG. 5 in that step SB1 and step SB2 are executed after step SA1, step SB3 is executed after step SA2, and step SB4 is executed instead of step SA3. In the following description, processes that are the same as the processes illustrated in FIG. 5 according to the first exemplary embodiment mentioned above are denoted by the same symbols, and a description of those processes is omitted.

First, the user instructs output of document data and specifies the device to which to output the document data, by using the UI unit 13 of the data processing device 10B. The UI unit 13 outputs information corresponding to an operation made by the user. On the basis of the information outputted from the UI unit 13, the controller 11 accepts information indicating the output instruction for document data and the image output device (step SA1).

Once the image output device is specified, the controller 11 performs image analysis on the document data, and extracts an image that serves as the basis for determining handling of document data (step SB1). Specifically, the controller 11 analyzes the image of the front cover of the document, and extracts a specific image indicating high confidentiality, such as an image representing characters such as "confidential" or "secret" by a technique such as pattern matching. The controller 11 determines the confidentiality level of the document data on the basis of the result of processing in step SB1 (step SB2). In the second exemplary embodiment, in a case where a specific image is not extracted from the document data, the controller 11 determines the document as "specified as confidential information", and sets the confidentiality level to "1". In a case where a specific image is not extracted, the controller 11 sets the confidentiality level to "0".

Next, the controller 11 determines the security level. First, the controller 11 inquires the device specified as the image output device in step SA1, that is, the image forming device 20, for the setting value of security print, and acquires setting information about security print from the image forming device 20 (step SA2). The process in step SA2 is the same as the process according to the first exemplary embodiment mentioned above. The controller 11 determines the security level on the basis of the acquired setting information (step SB3). Specifically, on the basis of the contents of the security level table 172, in a case where the acquired setting information indicates "security print ON", the controller 11 determines the security level as "1", and in a case where the acquired setting information indicates "security print OFF", the controller 11 determines the security level as "0".

Next, the controller 11 compares the confidentiality level of the document data determined in step SB2 with the security level determined in step SB3 (step SB4). In a case where the value of the security level is greater than or equal to the value of the confidentiality level (step SB4; YES), the controller 11 instructs the image output device, that is, the image forming device 20 to output the document data (step SA4). In step SA4, the controller 11 assigns a user ID to the document data and the output instruction for the document data, and transmits the document data and the output instruction to the image forming device 20.

A case where the result of the determination in step SB4 is "YES" is either one of the following cases: when the value of security level is greater than the value of confidentiality level; and when the value of security level is equal to the value of confidentiality level. In this case, as in normal processing, the controller 11 transmits the document data to the image output device (the image forming device 20) as it is, and instructs output of the document data. When the controller 21 of the image forming device 20 receives the document data and the output instruction from the data processing device 10B, the controller 21 makes reference to the setting information of "security print" stored in the memory 27 of the image forming device 20. In a case where the value of "security print" is "OFF", the controller 21 outputs the received document data as it is. In a case where the value of "security print" is "ON", the controller 21 temporarily accumulates the received document data into a predetermined storage area in the memory 27, and waits until user authentication is performed by the user.

In a case where the value of "security print" for the image forming device 20 is "ON", the user moves to a place where the image forming device 20 is installed, and instructs output of the document data, by using the UI unit 23 of the image forming device 20. The controller 21 displays on the UI unit 23 a screen that prompts entry of user information for performing user authentication on the basis of operational information outputted from the UI unit 23, and the user enters user information by using the UI unit 23. The controller 21 performs user authentication on the basis of the entered user information, and in a case where the user authentication succeeds, the controller 21 causes the document data accumulated in the memory 27 to be outputted to the image forming unit 15.

In a case where the value of security level is determined to be smaller than the value of confidentiality level in step SB4 (step SB4; NO), the controller 11 proceeds to step SA5. A case where the result of the determination in step SB4 is "NO" is when the value of security level is smaller than the value of confidentiality level, that is, when there is a possibility of the document data being outputted without user authentication even though the document data is highly confidential. In this case, in the second exemplary embodiment, instead of transmitting the document data to the image output device (the image forming device 20), the following processes as illustrated in step SA5 and in step S11 of FIG. 6 are executed. That is, the controller 11 temporarily stores the document data into a predetermined storage area in the memory 17 of the data processing device 10B (step SA5), and transmits image data including a code image and an output instruction for the image data to the image forming device 20 (step S11 in FIG. 6). Since the flow of processing executed in the data processing device 10B and the image forming device 20 in a case where the security print setting is OFF is the same as in the processing illustrated in FIG. 6 described above with reference to the first exemplary embodiment, a description of the processing is omitted here.

<Third Exemplary Embodiment>

Next, a third exemplary embodiment of the invention will be described. The third exemplary embodiment differs from the above-mentioned first exemplary embodiment in the processing executed by the controller 11 of the data processing device 10. The system configuration and the hardware configurations of the data processing device 10 and image forming device 20 according to the third exemplary embodiment are the same as those of the first exemplary embodiment mentioned above. Accordingly, in the following description, components that are the same as those of the first exemplary embodiment mentioned above are denoted by the same symbols and a description of those components is omitted.

Figure 14:
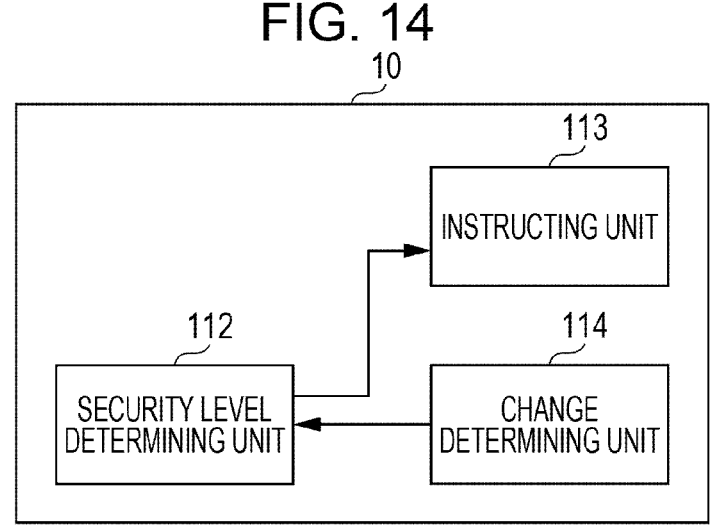
FIG. 14 is a block diagram illustrating an example of the functional configuration of a data processing device.

FIG. 14 is a block diagram illustrating a functional configuration of the data processing device 10 according to the third exemplary embodiment. FIG. 14 corresponds to FIG. 4 according to the first exemplary embodiment mentioned above. In FIG. 14, the security level determining unit 112 and the instructing unit 113 are the same as those illustrated in FIG. 4. A change determining unit 114 determines whether or not the level of security related to leakage of information in an image output device has been changed, in a case where transmission of information that prompts for change of the level of security has been instructed by the instructing unit.

The output determination process executed by the data processing device 10 according to the third exemplary embodiment is the same as the process illustrated in FIG. 5 described above with reference to the first exemplary embodiment. Accordingly, a description of the process is omitted here.

Figure 15:
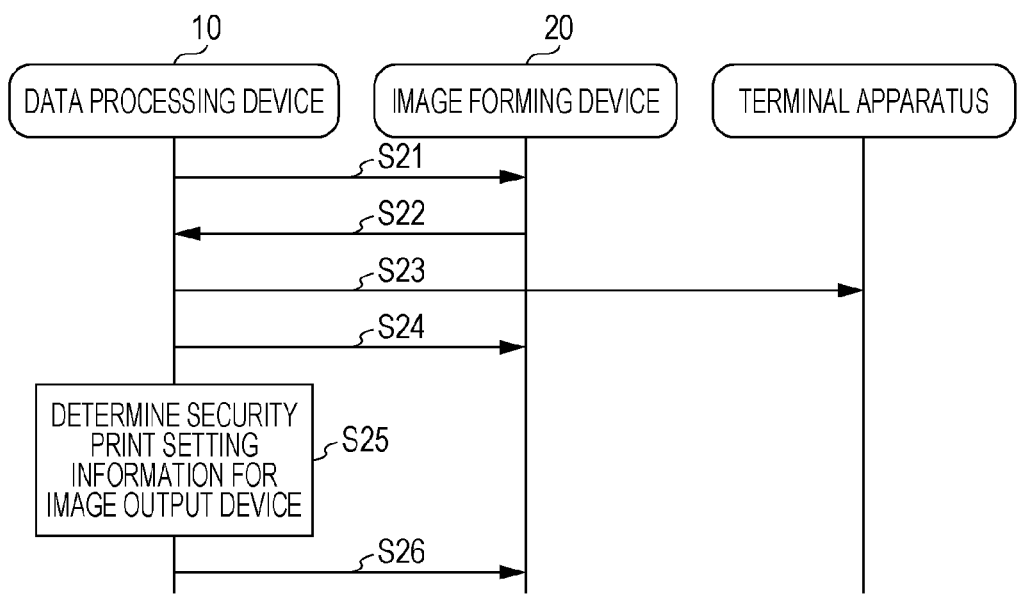
FIG. 15 is a sequence diagram illustrating a flow of processing executed by a data processing device and an image forming device.

FIG. 15 is a flowchart illustrating a flow of processing executed by the data processing device 10. FIG. 15 corresponds to FIG. 6 described above with reference to the first exemplary embodiment. In a case where it is determined that the security print setting for the image forming device 20 is OFF, the controller 11 inquires the image forming device 20 for the email address of the administrator of the image output device (the image forming device 20) (step S21), and acquires the email address of the administrator from the image forming device 20 (step S22). Upon acquiring the email address, the controller 11 transmits, to the acquired email address, an email that prompts for change of the setting to one that satisfies a predetermined security level (prompts for change of the security print setting) (step S23). In this email, for example, a message such as "To prevent information leakage, please change the security print setting to "ON"" may be included.

The administrator of the image forming device 20 checks the email transmitted by the data processing device 10 on his/her terminal apparatus, and then changes the security print setting to "ON" by using the UI unit 23 of the image forming device 20. The controller 21 of the image forming device 20 changes the value of security print setting information on the basis of operational information outputted from the UI unit 23. Alternatively, the administrator of the image forming device 20 may change the value of security print setting information by performing a remote control operation for the image forming device 20.

The controller 11 of the data processing device 10 inquires for the value of security print setting information for the image forming device 20 at predetermined time intervals (step S24). The controller 11 determines whether or not the value of security print setting information acquired by polling is ON (step S25). In a case where the setting value is ON, the controller 11 instructs the image output device, that is, the image forming device 20 to output document data (step S26). In a case where the setting value is OFF, the controller 11 continues the polling of the security print setting information. That is, in the third exemplary embodiment, the data processing device 10 checks, at predetermined time intervals, whether or not the setting value of security print for the image forming device 20 has been changed so as to satisfy a predetermined condition, and in a case where the setting value has been changed, the data processing device 10 instructs the image forming device 20 to output document data.

<Fourth Exemplary Embodiment>

Figure 16:
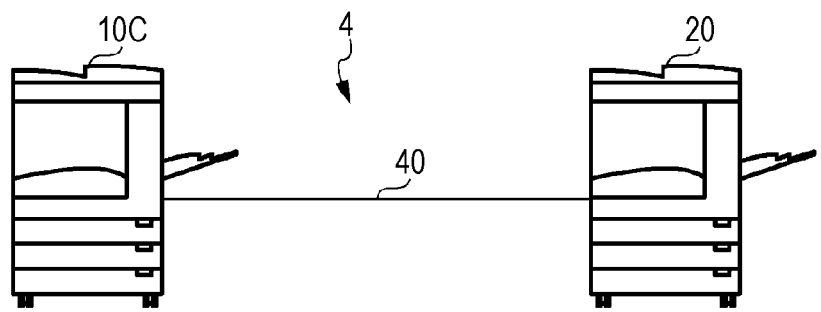
FIG. 16 is a schematic diagram illustrating an example of the overall configuration of a system.

Next, a fourth exemplary embodiment of the invention will be described. FIG. 16 is a schematic diagram illustrating the overall configuration of a system 4 according to the fourth exemplary embodiment of the invention. The system 4 includes a data processing device 10C, and the image forming device 20. The image forming device 20 is the same as that illustrated in FIG. 1 described above with reference to the first exemplary embodiment. The data processing device 10C is, for example, an electrophotographic image forming device.

Figure 17:
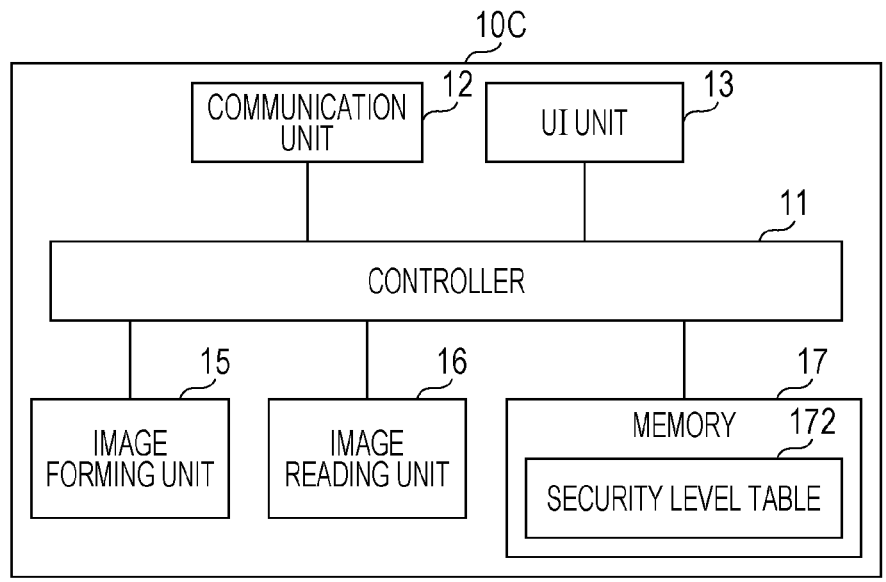
FIG. 17 is a block diagram illustrating an example of the hardware configuration of a data processing device.

FIG. 17 is a block diagram illustrating a hardware configuration of the data processing device 10C. In FIG. 17, the controller 11, the communication unit 12, the UI unit 13, and the memory 17 are the same as those of the data processing device 10 according to the first exemplary embodiment mentioned above. Accordingly, these components are denoted by the same symbols, and a description of these components is omitted.

Figure 18:
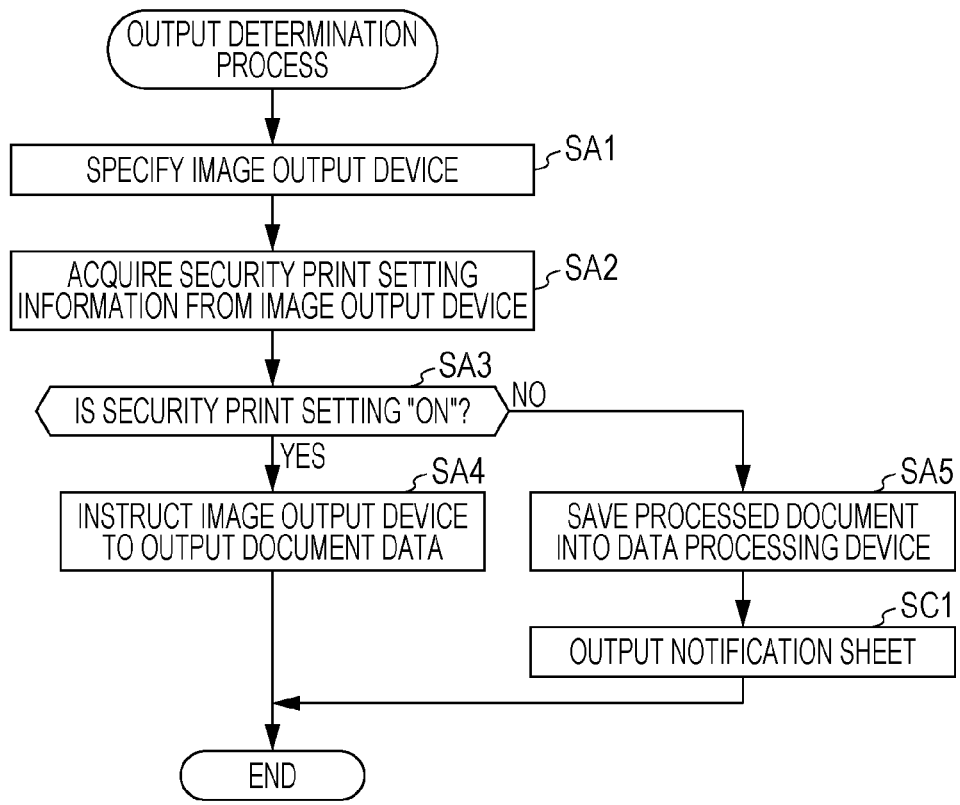
FIG. 18 is a flowchart illustrating a flow of an output determination process executed by a data processing device.

FIG. 18 is a flowchart illustrating a flow of processing executed by the data processing device 10C according to the fourth exemplary embodiment. FIG. 18 corresponds to FIG. 5 described above with reference to the first exemplary embodiment. The flowchart illustrated in FIG. 8 differs from the flowchart illustrated in FIG. 5 in that step SC1 is executed after step SA5. In the fourth exemplary embodiment, instead of instructing the image forming device 20 to output a notification sheet (that is, executing step S11 in FIG. 6), the controller 11 of the data processing device 10C outputs a notification sheet from the data processing device 10C by controlling the image forming unit 15 (step SC1). Alternatively, the data processing device 10C may be configured to output a notification sheet from the data processing device 10C, and also instruct the image forming device 20 to output a notification sheet. That is, a notification sheet may be outputted from each of the data processing device 10C and the image forming device 20.

<Modifications>

Each of the exemplary embodiments mentioned above is illustrative of an example of the invention, and may be modified as described below. In addition, each of the exemplary embodiments and each of the modifications described below may be combined as appropriate.

(1) In the first, second, and fourth exemplary embodiments mentioned above, the image forming device 20 as an image output device reads a code image formed on a notification sheet to thereby determine the address at which document data is stored. However, cases are also conceivable in which the image output device does not include the function of interpreting a code image such as a QR code. Accordingly, instead of outputting a notification sheet on which a code image is formed, the controller 11 may output a notification sheet on which an image representing information necessary for accessing document data stored in the data processing device 10 (such as an IP address or a URL) is formed.

In this case, the controller 11 generates image data representing an image including a character string indicating information necessary for accessing document data stored in the data processing device 10 (such as an IP address or a URL). Then, the controller 11 transmits the generated image data and an output instruction for the image data to the image forming device 20 that is an image output device. This image data may include, for example, data representing messages such as "The document is not outputted because the security print setting is OFF" and "To output the document, please follow the procedure described in this sheet". When the controller 21 of the image forming device 20 receives the image data and the output instruction for the image data from the data processing device 10, the controller 21 controls the image forming unit 25 in accordance with the received output instruction, and forms an image representing the image data on a medium such as a sheet of paper. As the "notification sheet", as in the first exemplary embodiments mentioned above, only one sheet may be outputted or, for example, such a "notification sheet" may be outputted from the image forming device 20 at predetermined time intervals.

The user checks the "notification sheet" outputted from the image forming device 20. The "notification sheet" outputted at this time describes a character string indicating the procedure for acquiring document data and the storage location of document data. The user operates the image forming device 20 in accordance with the described procedure. When the user performs an operation for acquiring document data by using the UI unit 23, the controller 21 displays, on the UI unit 23, a screen that prompts the user to enter user information for performing user authentication. By using the UI unit 23, the user enters user information, and also enters information about the storage location of document data described in the "notification sheet". Then, the controller 21 performs user authentication by using the entered user information, and when the user authentication succeeds, the controller 21 accesses the storage location indicated by the entered storage location information, and acquires document data. Then, the controller 21 controls the image forming unit 25 to output the acquired document data by forming the image of the document data on a medium such as a sheet of paper.

Figure 19:
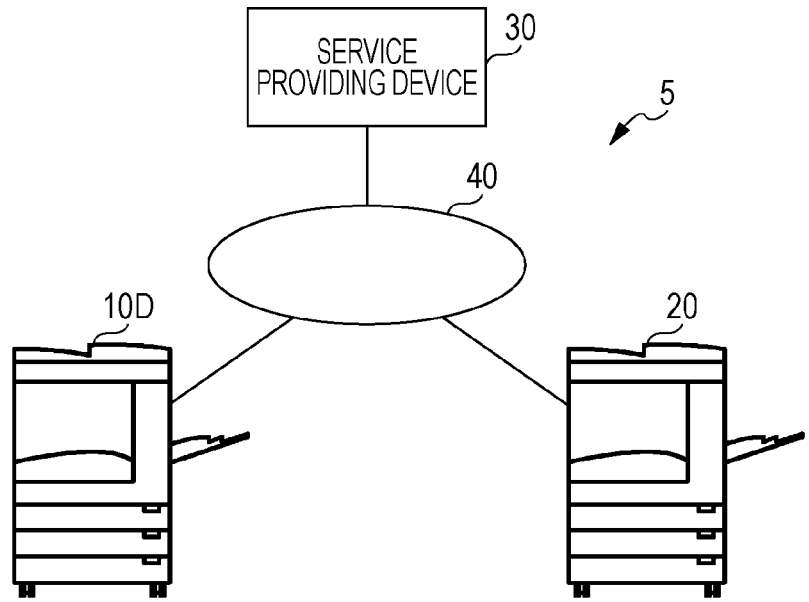
FIG. 19 is a schematic diagram illustrating an example of the overall configuration of a system.

(2) In the exemplary embodiments mentioned above, the data processing device 10, 10B, or 10C may request a service providing device 30 for information processing with respect to the document data to be outputted, and the document data to which information processing has been applied by the service providing device (hereinafter, also referred to as "processed document data") may be outputted to the image forming device 20. FIG. 19 is a schematic diagram illustrating the overall configuration of a system 5 according to this modification. The system 5 includes a data processing device 10D, the image forming device 20, and the service providing device 30. The configuration of the data processing device 10D is the same as that of the data processing device 10C according to the fourth exemplary embodiment.

The service providing device 30 is a device that provide services that apply processing to data. The service providing device 30 provides various services including, for example, a service that performs translation, a service that performs character recognition such as optical character recognition (OCR) on data that represents a document (hereinafter, referred to as "document data"), and a service that analyzes multiple pieces of image data and detects their differences. The service providing device 30 may be provided in the manner of a so-called cloud service. Alternatively, services may be provided by multiple service providing devices 30. However, for the ease of understanding, the following description assumes that processing is performed by a single service providing device 30 illustrated in FIG. 19.

Next, operation according to this modification will be described with reference to the flowchart illustrated in FIG. 20. The flowchart illustrated in FIG. 20 differs from the flowchart illustrated in FIG. 5 in that step SD1 is executed instead of step SA1, and step SD2 and step SD3 are executed after step SD1. In this operation example, a medium such as a sheet of paper is scanned by the data processing device 10D, and the service providing device 30 applies specified information processing to document data generated by the scan.

Figure 20:
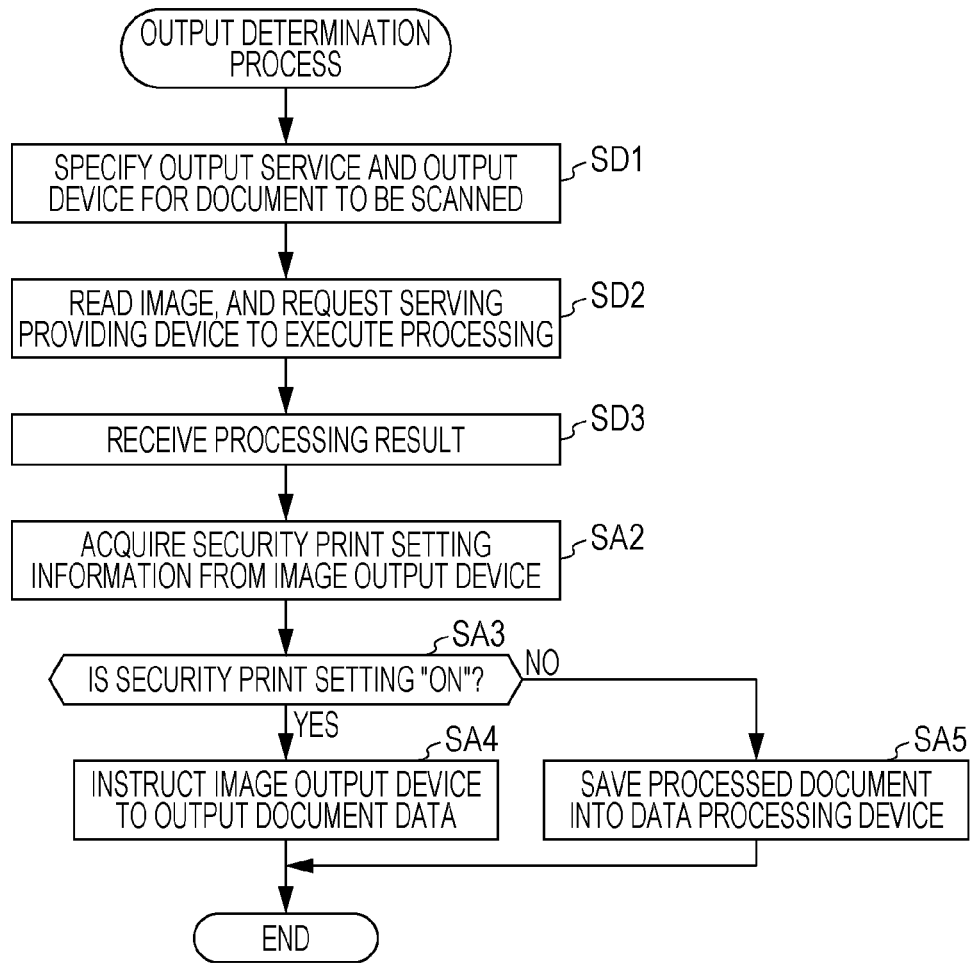
FIG. 20 is a flowchart illustrating a flow of an output determination process executed by a data processing device.

In FIG. 20, first, the user sets a document (medium) to be scanned on the image reading unit 16. At the same time, by using the UI unit 13 of the data processing device 10D, the user instructs processing to be performed for document data, and specifies the device to which to output the document data. The UI unit 13 outputs information corresponding to an operation made by the user. On the basis of the information outputted from the UI unit 13, the controller 11 accepts information indicating the processing (output service) to be applied to the document data, and the image output device (step SD1).

Once the output service and the image output device are specified, the controller 11 controls the image reading unit 16 to read the medium set on the image reading unit 16, and performs specified processing on document data generated by reading an image on the medium. In a case where specified processing is provided by the service providing device 30, the controller 11 transmits document data to the service providing device 30, and requests the service providing device 30 to execute the processing (step SD2). The service providing device 30 executes the requested processing on the basis of data received from the data processing device 10D.

When the service providing device 30 completes the requested processing, and transmits the processing result to the data processing device 10D, the data processing device 10D receives the processed document data from the service providing device 30 (step SD3). Upon receiving the document data, the controller 11 of the data processing device 10D proceeds to the processes from step SA2 onward, and executes acquisition of the security print setting information.

Figure 21:
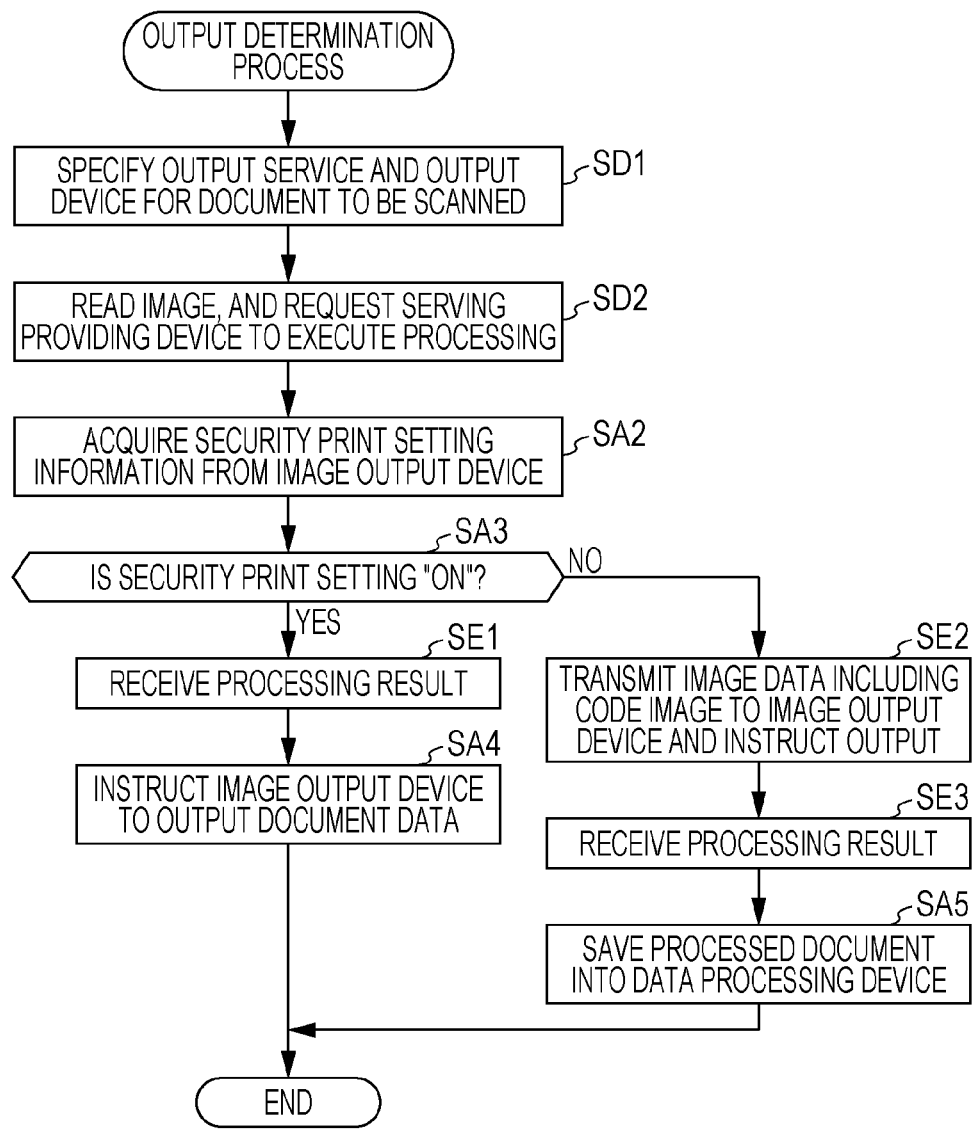
FIG. 21 is a flowchart illustrating a flow of an output determination process executed by a data processing device.

(3) In the modification (2) mentioned above, the controller 11 determines the setting value of security print (step SA3 in FIG. 20) after receiving the processing result (step SD3 in FIG. 20), and instructs a notification sheet to be printed in a case where the setting is OFF. However, the timing to determine the setting value and the timing to output (or the timing to instruct output of) a notification sheet are not limited to those illustrated in FIG. 20. For example, as illustrated in FIG. 21, the determining of the setting value (step SA3), and the instructing for output (or the outputting) of a notification sheet (step SE2) may be performed prior to reception of the processing result from the service providing device 30 (step SE1 or step SE3). In particular, in a case where a notification sheet is outputted by the data processing device 10D, a notification sheet is outputted from the data processing device 10D immediately after the data processing device 10D is operated by the user. Therefore, it is easy to notify the user of the fact that the security level of the image output device (the image forming device 20) does not satisfy a predetermined criterion.

(4) The first exemplary embodiment and the third exemplary embodiment mentioned above may be combined. That is, in a case where the security level of the image forming device 20 does not satisfy a predetermined condition, the controller 11 may output a notification sheet, and also transmit an email that prompts for change of the security print setting of the image forming device 20 to the administrator of the image forming device 20.

(5) In the exemplary embodiments mentioned above, the document data to be processed may be data stored in the memory 17 in advance. Alternatively, the document data to be processed may be data received via the communication unit 12, or data inputted via an interface such as a universal serial bus (USB) cable. As another example, for instance, the document data to be processed may be data that is inputted by causing the image reading unit to scan a medium such as a sheet of paper on which an image is formed. Further, the document data to be processed may be determined by specifying document data stored in a predetermined storage area (such as the memory of the service providing device 30).

In the exemplary embodiments mentioned above, document data is used as the data to be processed. However, the data to be processed in the above exemplary embodiments is not limited to data representing a document. For example, the data to be processed may be image data representing various images, such as data representing a photograph or drawing.

In the third exemplary embodiment mentioned above, an email that prompts for changing the setting to one that satisfies a predetermined security level is transmitted to the email address of the administrator in step S23 illustrated in FIG. 15. However, the method of providing a notification to the administrator is not limited to this. For example, the notification may be provided by an instant message or a short message service (SMS). That is, any method of notification may be used as long as the notification prompts the administrator to change the level of security related to leakage of information in an image output device.

(6) In the second exemplary embodiment mentioned above, as a method of determining the confidentiality level of document data, it is determined whether or not the document data includes an image indicating high confidentiality. However, the manner of determining the confidentiality level is not limited to this. For example, the confidentiality level may be determined by the controller 11 by applying a predetermined character recognition process to the document data and determining whether or not a predetermined character string is included in the document data. That is, any method that determines the level of confidentiality of document data may be used. Further, in the exemplary embodiments mentioned above, the controller 11 sets the confidentiality level of document data to "1" or "0". However, the security level may be classified into three or more levels.

Further, in the exemplary embodiments mentioned above, the controller 11 determines the security level by making reference to the setting value of "security print" for the image forming device 20. However, the manner of determining the security level is not limited to this. For example, the controller 11 may be configured to acquire information about the environment in which the image forming device 20 is installed, and determine the security level to be low in a case where the image forming device 20 is installed in a different department or in a geographically distant location (such as another office or another building). Further, the controller 11 may make an inquiry to the user in a case where security print is not set (as to whether the document data may be outputted as it is or whether a notification print is to be outputted).

(7) In the modification (2) mentioned above, in a case where the security level with regard to the manner of output by the image forming device 20 does not satisfy a predetermined condition, the document data to which information processing has been applied by the service providing device 30 is temporarily accumulated by the data processing device 10. However, the document data to which information processing has been applied may not be acquired by the data processing device 10 but retained by the service providing device 30. In this case, the controller 11 may be configured so that the controller 11 does not receive the processed document data from the service providing device 30 until an acquisition request for document data is received from the image forming device 20, and once the acquisition request for document data is received from the image forming device 20, the controller 11 then acquires the document data from the service providing device 30 at that timing, and outputs the received document data to the image forming device 20. Further, in this configuration, the image forming device 20 may directly acquire the document data to be outputted, from the service providing device 30.

(8) In the second exemplary embodiment mentioned above, the confidentiality level is determined on the basis of document data to which information processing has not yet been applied. However, the confidentiality level may be determined on the basis of document data to which information processing has already been applied.

Further, in determining whether confidentiality exists or not (whether the level of confidentiality is high or low), the confidentiality level may be determined to be high in a case where data in a format considered to be personal information, for example, an email address or a telephone number, is extracted.

Further, when generating a notification sheet, the controller 11 may acquire device information (such as information indicating whether or not the image forming device 20 includes the function of interpreting code information such as a QR code) about the image forming device 20, and may, in accordance with the acquired information, change the contents of the "notification sheet" (whether or not the notification sheet includes a QR code or a description by text, and information about the description).

(9) Programs executed by the data processing device 10, the data processing device 10B, the data processing device 10C, or the data processing device 10D, and the image forming device 20 may be downloaded via a communication line such as the Internet. In addition, each of these programs may be provided while being recorded on a computer readable recording medium such as an optical recording medium (such as an optical disc), a magneto-optical recording medium, or a semiconductor memory.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
a security level determining unit configured to determine a security level of an image processing device, the security level indicating a level of security related to leakage of information in the image processing device;
an instructing unit configured to change an output method of outputting data by the image processing device to an output method having a high security level and to provide to at least one of the image processing device and a different device, in a case where the security level of the image processing device does not satisfy a predetermined condition, at least one of an instruction for outputting information notifying the output method that has been changed, and an instruction for outputting information prompting for change of the security level in the image processing device; and
a confidentiality level determining unit configured to determine a confidentiality level, the confidentiality level indicating a level of confidentiality of the data to be outputted,
wherein in a case where a relationship between the confidentiality level and the security level satisfies a second condition that is determined in advance, the instructing unit transmits to the image processing device the data to be outputted, and in a case where the relationship between the confidentiality level and the security level does not satisfy the second condition, the instructing unit instructs one of the image processing device and the different device to output at least one of the information notifying the output method and the information prompting for change of the security level,
wherein in the case where the relationship between the confidentiality level and the security level does not satisfy the second condition, the instructing unit transmits the information prompting for change of the security level to an administrator of the image processing device,
wherein the information processing device further comprises a change determining unit configured to determine whether or not the security level in the image processing device has been changed, in response to the transmitted information prompting for change of the security level,
wherein in a case where it is determined by the change determining unit that the security level in the image processing device has been changed, the security level determining unit determines the changed security level, and
wherein in a case where the relationship between the confidentiality level and the changed security level satisfies the second condition, the instructing unit transmits to the image processing device the data to be outputted.

2. The information processing device according to claim 1, wherein in the case where the relationship between the confidentiality level and the security level does not satisfy the second condition, the instructing unit instructs one of the image processing device and the different device to output the information notifying the output method.

3. The information processing device according to claim 2, wherein in the case where the relationship between the confidentiality level and the security level does not satisfy the second condition, the instructing unit transmits the information prompting for change of the security level to an administrator of the image processing device.

4. The information processing device according to claim 1, wherein the confidentiality level determining unit determines the confidentiality level on a basis of whether or not the data to be outputted includes one of predetermined data and data that is in a predetermined format.

5. The information processing device according to claim 1, wherein the security level determining unit determines the security level on a basis of whether or not user authentication is required for output of the data in the image processing device.

6. The information processing device according to claim 1, wherein the security level determining unit is configured to obtain the security level of the image processing device from the image processing device.

7. The information processing device according to claim 1, wherein the instructing unit is configured to change the output method to the output method having the high security level in the case where the security level of the image processing device does not satisfy the predetermined condition, and is configured to not change output method to the output method having the high security level in the case where the security level of the image processing device does satisfy the predetermined condition.

8. The information processing device according to claim 1, wherein the output method having the high security level corresponds to a method of authenticating a user of the image processing device in order to output the data.

9. The information processing device according to claim 1, wherein the output method having the high security level includes transmitting, to the image processing device, image data including a code image to be output by the image processing device for allowing access to the data to be output.

10. A non-transitory computer readable medium storing a program causing a computer to execute a process, the process comprising:
determining a security level of an image processing device, the security level indicating a level of security related to leakage of information in the image processing device;
changing an output method of outputting data by the image processing device to an output method having a high security level, and providing to at least one of the image processing device and a different device, in a case where the security level does not satisfy a predetermined condition, at least one of an instruction for outputting information notifying the output method that has been changed, and an instruction for outputting information prompting for change of the security level in the image processing device; and determining a confidentiality level, the confidentiality level indicating a level of confidentiality of the data to be outputted, wherein the changing comprises:

in a case where a relationship between the confidentiality level and the security level satisfies a second condition that is determined in advance, transmitting to the image processing device the data to be outputted, in a case where the relationship between the confidentiality level and the security level does not satisfy the second condition, instructing one of the image processing device and the different device to output at least one of the information notifying the output method and the information prompting for change of the security level, wherein the instructing the one of the image processing device and the different device comprises, in the case where the relationship between the confidentiality level and the security level does not satisfy the second condition, transmitting the information prompting for change of the security level to an administrator of the image processing device, and wherein the process further comprises:

determining whether or not the security level in the image processing device has been changed, in response to the transmitted information prompting for change of the security level, in a case where it is determined that the security level in the image processing device has been changed, determining the changed security level, and in a case where the relationship between the confidentiality level and the changed security level satisfies the second condition, transmitting to the image processing device the data to be outputted.

11. An information processing method comprising:

determining a security level of an image processing device, the security level indicating a level of security related to leakage of information in the image processing device;

changing an output method of outputting data by the image processing device to an output method having a high security level, and providing to at least one of the image processing device and a different device, in a case where the security level does not satisfy a predetermined condition, at least one of an instruction for outputting information notifying the output method that has been changed, and an instruction for outputting information prompting for change of the security level in the image processing device; and determining a confidentiality level, the confidentiality level indicating a level of confidentiality of the data to be outputted, wherein the changing comprises:

in a case where a relationship between the confidentiality level and the security level satisfies a second condition that is determined in advance, transmitting to the image processing device the data to be outputted, in a case where the relationship between the confidentiality level and the security level does not satisfy the second condition, instructing one of the image processing device and the different device to output at least one of the information notifying the output method and the information prompting for change of the security level, wherein the instructing the one of the image processing device and the different device comprises, in the case where the relationship between the confidentiality level and the security level does not satisfy the second condition, transmitting the information prompting for change of the security level to an administrator of the image processing device, and wherein the method further comprises:

determining whether or not the security level in the image processing device has been changed, in response to the transmitted information prompting for change of the security level, in a case where it is determined that the security level in the image processing device has been changed, determining the changed security level, and in a case where the relationship between the confidentiality level and the changed security level satisfies the second condition, transmitting to the image processing device the data to be outputted.

12. An information processing device comprising:

a security level determining unit configured to determine a security level of an image processing device, the security level indicating a level of security related to leakage of information in the image processing device;

an instructing unit configured to provide to at least one of the image processing device and a different device, in a case where the security level of the image processing device does not satisfy a predetermined condition, an instruction for outputting information prompting for change of the security level in the image processing device; and a confidentiality level determining unit configured to determine a confidentiality level, the confidentiality level indicating a level of confidentiality of the data to be outputted, wherein in a case where a relationship between the confidentiality level and the security level satisfies a second condition that is determined in advance, the instructing unit transmits to the image processing device the data to be outputted, and in a case where the relationship between the confidentiality level and the security level does not satisfy the second condition, the instructing unit instructs one of the image processing device and the different device to output the information prompting for change of the security level, wherein in the case where the relationship between the confidentiality level and the security level does not satisfy the second condition, the instructing unit transmits the information prompting for change of the security level to an administrator of the image processing device, wherein the information processing device further comprises a change determining unit configured to determine whether or not the security level in the image processing device has been changed, in response to the transmitted information prompting for change of the security level, wherein in a case where it is determined by the change determining unit that the security level in the image processing device has been changed, the security level determining unit determines the changed security level, and wherein in a case where the relationship between the confidentiality level and the changed security level satisfies the second condition, the instructing unit transmits to the image processing device the data to be outputted.

13. The information processing device according to claim 12, wherein the change of the security level is a change so that the security level of the image processing device satisfies the predetermined condition.

* * * * *